July 21, 1931. J. G. PETERSON 1,815,634
ELECTRIC SWITCH
Filed May 21, 1927
Fig.1 Fig.2
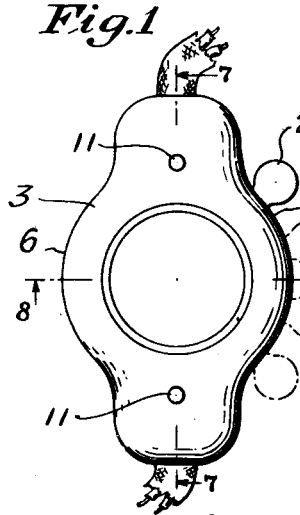
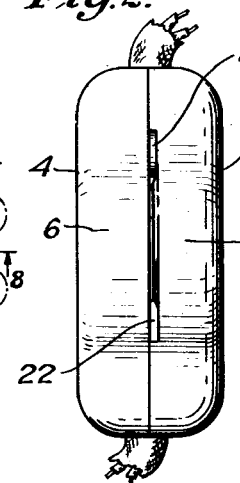
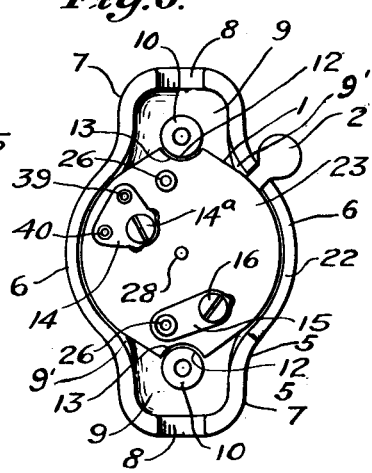
Fig.3.
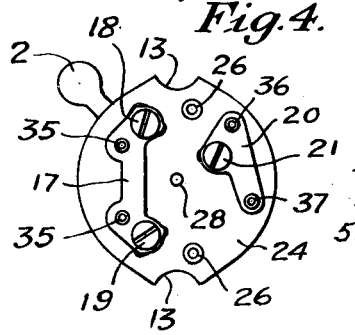
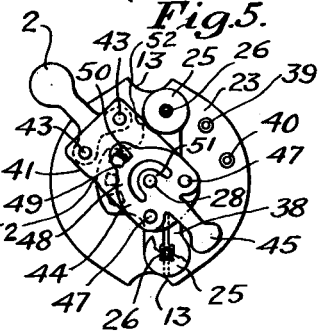
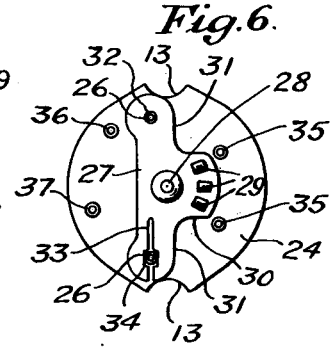
Fig.4. Fig.5. Fig.6.
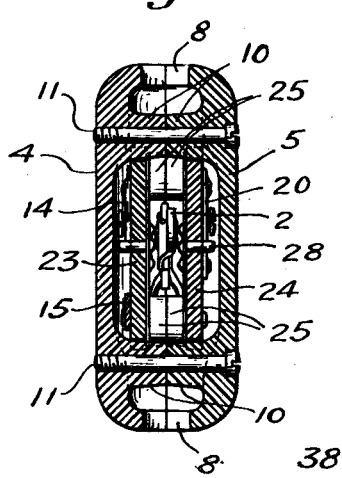
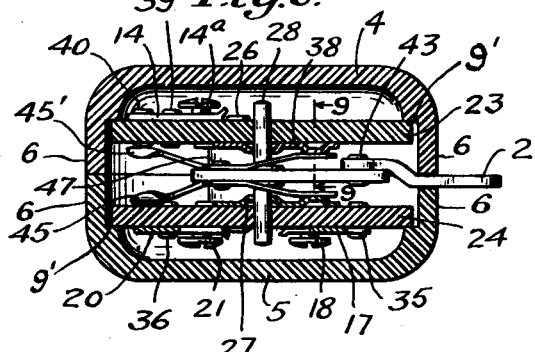
Fig.7. Fig.8.
Fig.9.
Inventor
JOHANN G. PETERSON
by
Attorney.

Patented July 21, 1931

1,815,634

UNITED STATES PATENT OFFICE

JOHANN G. PETERSON, OF WEST HARTFORD, CONNECTICUT

ELECTRIC SWITCH

Application filed May 21, 1927. Serial No. 193,327.

My invention relates to electric switches. It has for its object to provide an improved electric switch. A further object of my invention is to provide an improved electric switch adapted to make and break a plurality of different circuit connections as it is operated, and especially adapted to use in connection with a heating device. A still further object of my invention is to provide an improved switch of this character which is an improvement over another switch described and claimed in my co-pending application Serial No. 158,946, filed Jan. 4, 1927, and which may be manufactured more economically, is more compact and accordingly more convenient in use, and further, is more safe in operation than previous switches of this type. These and other objects and advantages of my improved construction will, however, hereinafter more fully appear.

In the accompanying drawings I have shown, for purposes of illustration, one embodiment which my invention may assume in practice.

In these drawings,—

Figure 1 is a side elevation of this form of my improved switch, showing the same enclosed in its casing and with different positions of the actuating member therefor indicated in dotted lines;

Fig. 2 is an elevation at right angles to Fig. 1;

Fig. 3 is a plan view with one part of the casing removed and showing the switch mechanism seated in the other part thereof;

Fig. 4 is a plan view of the opposite side of the switch mechanism when removed from the casing;

Fig. 5 is a view similar to Fig. 4 but with certain parts removed to show the switch mechanism more in detail;

Fig. 6 is a plain view of the parts removed from Fig. 5 to show the inside surface thereof, the outside of the same being shown in Fig. 4;

Fig. 7 is a sectional view on line 7—7 of Fig. 1;

Fig. 8 is a sectional view on line 8—8 of Fig. 1, the operating member being shown in an intermediate position, and Fig. 9 is a detail view on line 9—9 of Fig. 8.

In this illustrative construction I have shown an improved switch of the general type described and claimed in my co-pending application mentioned above and comprising an improved switch unit generally designated 1 and operated by a single reversely swinging pivoted control member 2 through improved means and disposed in an improved manner in an improved casing generally designated 3, all as hereinafter more fully brought out.

Referring more particularly to the casing 3, it will be noted that this comprises a plurality of casing members 4 and 5, each having a curved or arcuate enlargement on each side, as at 6, intermediate its ends, and having reduced ends 7 and substantially flat outer sides cooperating to form a small, flat, conveniently handled casing when the two parts are brought together, and a casing normally tending to lie on one of its flat sides and especially convenient for holding in the hand in such manner as to permit the controlling or operating member 2 to be operated by the thumb of the hand holding the switch. Moreover, it will be noted that each end 7 of the casing is provided with a conductor opening 8, and that each portion 4, 5 is hollowed out from end to end at 9 and provided with longitudinally ledge portions between these openings, as shown at 9', so that it may receive the switch unit 1 and permit ready disposition of the conductors therein. In this preferred construction, it will also be noted that suitable outstanding abutments 10 of insulating material are provided on the bottoms of these chambers 9 and near the ends of each chamber. These abutments serve two functions, acting not only to receive suitable connecting means 11 holding the parts of the casing in assembled relation when the switch is therein but also acting as positioning means cooperating with the rounded walls of the chamber 9 in positioning the switch unit 1 therein; the members 10 herein each being provided with a rounded surface 12 cooperating with a correspondingly cut-away portion 13 on the switch unit so that the latter, while readily inserted, is definitely positioned in the casing. Moreover, it will be noted that these members 10 are so disposed that the terminals carried on the opposite sides of the switch unit 1 are located conveniently thereto so that the conductors may extend therefrom at one side of the portions 10 and out through the conductor openings 8. Thus, for example, it will be noted that one of the terminals 14 shown in Fig. 3 has a binding post 14ᵃ thereon conveniently located relative to the upper opening 8, while the other terminal 15 on the same side of the unit has a binding post 16 similarly conveniently located relative to the lower opening 8. The same is true of the opposite side of the unit shown in Fig. 4, wherein it will be noted that the terminal 17 has binding posts 18 and 19 conveniently located relative to the upper and lower openings 8, while the terminal 20 carries a binding post 21 conveniently arranged relative to the top opening 8. Attention is also directed to the fact that a suitable longitudinally extending aperture 22 is provided between the two casing members 4 and 5 to permit movement of the actuating member 2, this herein being in the form of an opening formed in the portion 6 of the member 5.

Considering the unit 1 more specifically, it will be noted that this unit includes a pair of superimposed insulating discs 23 and 24, each provided with cut-away portions 13 at diametrically opposite points thereon. Herein these discs 23 and 24 are spaced from one another by insulating washers 25 located opposite one another just at one side of these portions 13, these insulating washers serving to space the members 23 and 24 in such manner as to permit the switch mechanism to be housed between the same, and further, surrounding suitable connecting means, such, for example, as rivets 26, acting to unite the two discs into a unit.

Referring more particularly to the disc 24, which, when the unit is assembled, as shown in Fig. 3, is the bottommost disc, it will be noted that what then forms the bottom surface of the disc is shown in Fig. 4, whereas what would then be the upper surface of the disc is shown in Fig. 6. Considering Fig. 6 more specifically, it will be noted that an improved cam member 27 is seated on the member 24 on a center pin 28 which extends through both discs. This member 27, as shown, is provided with a plurality of cams or bentup portions 29 arranged radially with respect to the center pin 28 and spaced laterally therefrom and from one another. These portions 29 and the adjacent surface of the member 27 cooperate to form what may be called a hill-and-valley surface, each of the members 29 being peaked at its center and having sloping sides, while the adjacent flat surfaces of the member 27 form the valleys. Here it will also be noted that these members 29 are formed on a lateral extension 30 on the member 27 at one side of the pin 28, and that the member 27 is also provided with extensions 31 extending in opposite directions substantially at right angles to the extension 30 and toward the connecting means 26. Herein one of these extensions 31 is provided with a hole 32 adapting it to be inserted over a connecting means 26, while the other extension is split longitudinally, as shown at 33, and provided with an enlarged rectangular or straight-edged aperture 34 between the ends of the split. Thus, by making this aperture 34 slightly smaller than the connecting means 26, the parts of that portion 31 may be slightly spread apart when inserted on the connection 26 and thereby caused to grip that member very firmly, while still permitting it to be assembled or removed readily. Obviously, however, both extensions 31 may be of the same construction, if desired. Here attention is also directed to the fact that the terminal 17 is connected to this disc 24 by rivets 35 on one side of the member 27, while the terminal 20 is connected thereto by rivets 36, 37 on the opposite side of the member 27, the inner surfaces of the latter rivets also forming contacts, as hereinafter described.

Considering next the disc 23, it will be noted that it is of identic construction, and that it similarly carries between it and the insulating discs 25 a member 38 identic with the member 27 and adapted, when the parts are assembled as shown in Fig. 3, to overlie and coincide with the member 27, though spaced therefrom by the insulating discs 25 and the switch mechanism hereinafter described. In this instance, it will be noted that what may be called the split end of the member 38 engages with the connecting means 26, which extends through the terminal 15, as shown in Fig. 3, and also acts as a means of connecting that terminal to the outside surface of the member 23, the improved contact made possible by my improved split construction thus insuring a good contact connection with that terminal. Here it will be noted that the terminal 14 is attached to the outside of the disc 23 by suitable rivets 39 and 40, the inner ends of which also form contact surfaces, as hereinafter described.

Disposed between the discs 23 and 24 and cooperating with the contact surfaces 36, 37, 39 and 40, heretofore described, is a swinging contact carrying member, generally designated 41, movable at will reversely about the pin 28 by movement of the actuating member 2. Herein this contact carrying member is in the form of a substantially oblong piece of insulating material having the actuating member 2 attached at one end to one surface thereof by suitable attachment means 43 and identical combined actuating and contact members, generally designated 44, attached to the opposite sides of the opposite end thereof. Referring more particularly to these members 44, it will be noted that each of the same is provided with a raised movable spring contact bent up at the sides of its contact surface, the different superimposed contacts herein being designated for purposes of distinction as 45, 45'. Further, it will be noted that each of these contacts 45, 45' is connected by an elongated flexible neck to the body portion of the member 44, and that the latter is suitably attached at 47 to the member 41, the same attaching means acting to attach both members 44. Moreover, it will be noted that each member 44 is provided with an oppositely extending outstanding spring portion 48 of substantially U-shape having an extension 49 thereon, which in turn carries a cam portion 50 similar in form to one of the portions 29 on the members 27 and 38 and adapted to cooperate therewith. Attention is also directed to the fact that an extension 51 is provided on the member 44 between the contact necks and the extension 49, and that this portion is provided with a suitable aperture adapted to receive the pin 28. It will also be noted that cut-away portions 52 on the sides of the insulating body of the member 41 engage the discs 25 and cooperate therewith to form means limiting the swinging of the member 41.

Considering the operation of the switch, it will be observed that when the member 41 is placed in the relation shown in Fig. 8 between the discs 23 and 24 and so that the members 50 are adapted to engage and travel over the members 29 on the members 27 and 38, the contacts 45, 45' will be moved in an arc adapting them, respectively, to engage the contacts 36, 37 and the contacts 39, 40, whenever the member 2 is actuated to swing the member 41 about the pivot pin 28. Referring more particularly to the operation, it will be observed that when the actuating member 2 is in the position shown in Fig. 1 each of the members 50 will be at one end of the members 29, as shown in Fig. 5, while, as likewise shown in that figure, the contacts 45, 45' will both be disconnected from any contact. When, however, the member 2 is moved down toward the first dotted-line position indicated in Fig. 1, it will be noted that both of the members 50 on opposite sides of the member 41 will move up the adjacent member 29 in such manner as to compress their spring portions 48 and, when the members 50 have been carried over the high point of the members 29, thereby cause them to travel rapidly down the other side thereof. In this position, it will be evident that while the contact 45' will not be connected, the contact 45 will engage the contact surface provided by the inner end of the rivet 37, thereby establishing what, when the switch is connected to a heating device, is known as a low heat connection to the binding post 21 on the terminal 20. Similarly, when the actuating member is moved another notch from the full-line position shown in Fig. 1, it will be noted that the contact 45' is brought into engagement with the contact 40 connected to the terminal 14, forming what is called a medium heat connection, the contact 45 not then functioning. However, when the actuating member is moved one notch further down, both of the contacts 45, 45' are brought into operation, the contact 45 engaging the contact 36 and the contact 45' engaging the contact 39, to form what is known as a high heat connection. Further, it will be obvious that in each of these successive operations the members 50 will continue to function with the members 29 in such manner as to give a quick make-and-break connection to the contacts. In connection with the operation, it will also be noted that the stationary contacts are so arranged as to be adequately spaced from one another, not only laterally but by their location on different members 23, 24. Further, each movable contact is effectually insulated from the other. Thus, different movable contacts contact with different stationary contacts on the members 23, 24, and then both movable contacts simultaneously contact with a pair of stationary contacts, one of which is carried on each of the members 23, 24; thereby providing an exceedingly safe construction. Attention is also directed to the fact that through the provision of what in effect forms two simultaneously operating actuating means operating on opposite sides of the movable actuating member, a very effective throwing of the contact member is obtained, and one which is further adapted to wear well, the wear being distributed over a plurality of surfaces, and which further is very certain and quick in its operation.

In my improved construction it will also be observed that it is made possible to provide a device utilizing only one swinging member and two contacts, as distinguished from two and three, respectively, in my previous construction, and that it is further possible to combine the movable contacts and the movable actuating means in one member and utilize two such members of identical construction, thereby further reducing the cost. The members 27 and 38 are also identical, as may be the members 23 and 24 and the members 25 and 26. It will also be noted that all of the parts are of a type capable of being very cheaply manufactured, the metal switch parts being stampings, while the insulating parts are of simple form adapted to be very cheaply provided. Attention is also directed to the facility with which the mechanism may be assembled. These and other advantages of my improved construction will, however, be clearly apparent to those skilled in the art.

While I have in this application specifically described one embodiment which my invention may assume in practice, it will be understood that the same is shown for purposes of illustration and that the invention may be modified and embodied in various other forms without departing from its spirit or the scope of the appended claims.

What I claim as new and desire to secure by Letters Patent is:

1. An electric switch including a base carrying stationary contacts and a stationary snap actuating element, and a manually engaged pivoted member movable in one direction to make and break a plurality of circuits and carrying both a cooperating contact and a cooperating snap actuating element riding over said stationary element.

2. In an electric switch, a base carrying stationary contact means and a plurality of adjacent projections stationary with respect to said base, and a swinging actuating member pivoted on said base and carrying a manually engaged portion, a cooperating contact, and a movable cam element cooperating with said projections and riding over the same.

3. In an electric switch, a base carrying stationary contact means and a plurality of adjacent projections stationary with respect to said base, and a swinging actuating member pivoted on said base and carrying a manually engaged portion, a cooperating contact, and a movable cam element, said contact being movable between contact engaging positions with a snap action by said cam element riding over each of said projections.

4. In an electric switch, a base carrying stationary contact means and a plurality of adjacent projections stationary with respect to said base, and a swinging actuating member pivoted on said base and carrying a manually engaged portion, a cooperating contact, and a movable cam element resiliently supported thereon and moving said contact between contact engaging positions with a snap action as said cam element successively engages adjacent projections.

5. In an electric switch, a base carrying stationary contact means and a plurality of adjacent projections stationary with respect to said base, and an actuating member pivoted on said base and having a manually engaged portion, a cooperating contact, and a cam member resiliently supported thereon and adapted to engage simultaneously the adjacent slopes of adjacent projections.

6. In an electric switch, a contact carrying base, an actuating member pivoted thereon between its ends and carrying a contact at one end and an operating portion at the other, and cooperating means between said base and pivoted member for imparting a snap action to the latter moving it between contact engaging positions and including a movable member carried by the latter and a cooperating stationary member on the base.

7. In an electric switch, a switch base having contacts disposed in different planes, a swinging member having a manually engaged end and movable between said planes and carrying cooperating movable contacts, and means for imparting a quick snap action to said member moving it between contact engaging positions and including an actuating member carried thereby and actuated as said member is swung.

8. In an electric switch, a switch base having contacts disposed in different planes, a swinging member having a manually engaged end and movable between said planes and carrying cooperating movable contacts, and means for imparting a quick snap action to said member including resiliently mounted cam members carried on opposite sides of said swinging member and each formed integral with one of said cooperating contacts.

9. In an electric switch, a switch base having contacts disposed in different planes, a swinging contact member cooperating therewith and movable in a plane between said planes, said contact member being pivoted between its ends and carrying cooperating contact means on one end thereof and a manually engaged portion on its opposite end, and means between said swinging member and said base for imparting a quick snap action to said member moving it between contact engaging positions and including cooperating means on said base and swinging member on opposite sides of the latter and between its manually engaged end and its contact means.

10. In an electric switch, a switch base carrying contacts and having spaced base portions, a swinging contact carrying member movable between said portions, said contact member being pivoted and having manually engaged means on one end thereof, and means between said swinging member and said base for imparting a snap action to the former including resilient members carried on opposite sides of said movable member and cooperating stationary members between the same and the portions of said base each presenting a series of radially disposed spaced projections.

11. In an electric switch, a switch base having contacts disposed in different planes and comprising a pair of opposite contacts one in each plane and a spaced contact on the same side of each of said contacts, said spaced contacts being in different planes and unequally spaced from said opposite contacts, and a swinging member carrying cooperating movable contacts disposed opposite one another and respectively engaging contacts in different planes.

12. In a switch, superimposed switch bases each carrying a plurality of stationary contacts, and a manually adjustable pivoted contact carrying member movable between said bases and carrying a pair of contacts, said stationary and movable contacts being so disposed that said movable contacts successively engage contacts on different bases and then simultaneously engage a contact on each base.

13. In a switch, superimposed switch bases each carrying a plurality of stationary contacts, a manually adjustable pivoted contact carrying member movable between said bases and carrying a pair of contacts, said stationary and movable contacts being so disposed that said movable contacts successively engage contacts on different bases and then simultaneously engage a contact on each base, and actuating means disposed between said bases and adapted to impart a snap action to said pivoted member as its contacts move relative to said stationary contacts.

14. In a switch, superimposed switch bases each carrying a plurality of stationary contacts, a pivoted contact carrying member movable between said bases and carrying a pair of contacts, said stationary and movable contacts being so disposed that said movable contacts successively engage single contacts on different bases and then simultaneously engage a contact on each base, and actuating means adapted to impart a quick snap action to said pivoted member including stationary and movable cam carrying elements, certain of which are carried on opposite sides of said actuating member and one of which is carried by each of said base members.

15. In combination, a switch longitudinally divided casing comprising cooperating casing members presenting conductor openings at opposite ends thereof, a switch chamber between said openings, and unit supporting projections between said openings, and a switch unit disposed in said chamber and engaging said projections and carrying connections on its outer faces for conductors extending through said openings.

16. In combination, a switch casing comprising cooperating casing members and presenting conductor openings at opposite ends thereof, a switch chamber between said openings, and unit supporting means between said openings and spaced from opposite walls of said chamber, and a switch unit disposed in said chamber and supported on said means and carrying terminal and through connections on opposite faces.

17. In combination, a switch casing comprising cooperating casing members and presenting conductor openings at opposite ends thereof, a switch chamber between said openings, and unit support means between said openings and spaced from opposite walls of said chamber, and a switch unit disposed in said chamber having opposite edges supported on said means and carrying terminal connections on opposite faces.

18. In combination, a longitudinally divided switch casing comprising cooperating casing members presenting conductor openings at opposite ends thereof, a switch chamber between said openings, and projections adjacent said openings, and between the same and said chamber, and a switch unit disposed in said chamber between said projections and carrying connections for conductors extending through said openings, said unit being positioned longitudinally by said projections.

19. In combination, a switch unit carrying terminal connections on opposite faces, and a switch casing comprising cooperating casing members presenting conductor openings at opposite ends thereof, a switch chamber between said openings, projecting means in said casing members adjacent said openings and between the same and said chamber locating said unit longitudinally, and projecting means in said casing members locating said unit laterally.

20. In combination, a switch unit carrying terminal and through connections on its outer faces, a switch casing comprising cooperating casing members presenting conductor openings at opposite ends thereof, a switch chamber between said openings, unit locating projecting means in said casing members adjacent said openings presenting spaced passages leading therefrom to said chamber, and cooperating unit locating means acting to space the connections on said unit from opposite walls of said chamber.

21. In combination, a switch unit comprising insulating members having switch mechanism therebetween and terminal and through connections on the outer surfaces thereof, cooperating casing members enclosing said unit presenting conductor openings at opposite ends and also having projecting means inside said openings presenting conductor passages on opposite sides thereof leading to said connections, and means for connecting said casing members extending through said projecting means.

22. In combination, a switch unit comprising insulating members having switch mechanism therebetween and terminal and through connections on outer surfaces thereof, cooperating casing members enclosing said unit presenting conductor openings at opposite ends and having unit locating means between said openings and also having projecting means inside said openings presenting conductor passages on opposite sides thereof leading to said connections, and means for connecting said casing members extending through said projecting means.

23. In a switch unit, cooperating connected insulating members, switch mechanism between the same, terminal connections for said mechanism carried on the outer faces of different insulating members, and a through connection carried on the outer face of one of said members.

24. In a switch unit, cooperating connected spaced plates, a switch mechanism between said plates, terminal connections for said mechanism carried on the outer faces of different plates, and a through connection carried on the outer face of one of said plates.

25. In a switch unit, cooperating connected insulating members, a switch mechanism between said members having a plurality of circuit closing positions, terminal connections for said mechanism including two members on the outer face of one of said insulating members and one on the outer face of the other, and a through connection carried on the outer face of the insulating member carrying said last mentioned terminal connection.

26. In a switch unit, superimposed insulating plates carrying contacts cooperating snap switch mechanism between said plates having a stationary cam carrying plate carried by one of the same, and a contact carrying member swinging between said insulating plates and having resiliently supported means cooperating with said cam plate.

27. In a switch unit, superimposed insulating plates, one carrying contacts, insulated conducting means spacing and connecting the same, a cam carrying plate carried on one of said insulating plates and having a split end gripping said conducting means, and a swinging contact carrying member movable between said insulating plates and carrying a resilently supported member cooperating with a cam on said cam plate.

28. A combined movable contact and actuating member for a switch comprising an insulating base presenting an operating handle at one end and also adapted to be pivoted between its ends and carrying a combined resiliently supported actuating projection and resilient contact, said projection having its resilient support spaced from said base and said projection being carried on the opposite face of said support from said base.

29. A combined movable contact and actuating member for a switch including a base carrying movable contact means and presenting an operating handle at one end and having provision for pivoting between its ends and carrying on opposite faces thereof resilient supports and actuating projections, the resilient supports on each side of said base being spaced therefrom at one end and each actuating projection being disposed on the opposite side of its resilient support from said base.

30. In an electric switch, a combined movable contact and actuating member comprising a conducting body having an intermediate connection, a U-shaped resilient tongue extending in one direction therefrom and carrying an actuating projection, and a resilient extension projecting in the opposite direction therefrom and carrying a contact.

31. In an electric switch, a member of round cross section and a cooperating member having a slot and a larger communicating polygonal opening having edges gripping said first mentioned member.

32. In an electric switch, an actuating member comprising a portion presenting radially disposed actuating means and laterally located portions, one of said laterally located portions being longitudinally split to provide a gripping surface.

33. In an electric switch, spaced insulating members, stationary and movable contacts between the same, an actuating plate between the same, and an actuating member for the movable contact electrically connected thereto and to the actuating plate and moving between said insulating plates and engaging said actuating plate.

34. In an electric switch, spaced insulating members, stationary and movable contacts between the same, an actuating plate between the same, an actuating member for the movable contact electrically connected thereto and to the actuating plate and moving between said insulating plates and engaging said actuating plate, and terminal connections on said insulating plates including one electrically connected to said actuating plate.

35. In an electric switch, spaced insulating members, stationary and movable contacts between the same, spaced actuating plates between the same, and an actuating member for the movable contact moving between said actuating plates and carrying cooperating actuating means engaging each of the same.

36. In an electric switch, spaced insulating members, a plurality of stationary and a plurality of movable contact members between the same, spaced actuating plates between the same, and a movable actuating member for the movable contact members movable between said actuating plates and carrying actuating means engaging each of said actuating plates and each electrically connected to a movable contact and to the same actuating plate.

37. In an electric switch, spaced insulating members, stationary and movable contacts between the same, actuating means between the same for the movable contact member including a swinging actuating member, and means between said insulating members spacing the latter and limiting the swinging of said actuating member.

38. In an electric switch, an insulating base, stationary contact means thereon, terminals thereon, a movable actuating member, a movable contact member electrically connected thereto and engageable with said stationary contact means, and a stationary actuating member continuously electrically connected to one terminal and so engaging said movable actuating member as to effect a snap movement of said movable contact.

39. A casing member for electric through switches having a switch chamber between its ends provided with laterally located ledges above its bottom and having communicating end openings leading from the ends of said chamber and provided with conductor apertures at their ends and upstanding projections opposite said apertures and between the same and the switch chamber providing lateral passages leading from the conductor apertures to the switch chamber.

40. An electric switch unit comprising superimposed insulating plates spaced from one another and having contacts and terminal connections thereon, said insulating plates having edges of protruding curved form at one side thereof, and a switch mechanism between said plates operatively connected thereto and to said contacts and terminals and having a swinging actuating member projecting slightly beyond said edges of the plates and movable in an arc substantially conforming to the curvature of said edges.

41. In an electric switch, a casing presenting conductor openings at its opposite ends and having a protruding curved portion between its ends and extending longitudinally of the casing, and a switch mechanism in said casing having conductor terminals, means for making and breaking a multiplicity of circuits, and a pivoted actuating member the free end of which projects through the side of said casing adjacent said protruding curved portion and moves in either direction into a multiplicity of operative positions in an arc substantially conforming to the curvature of said curved portion.

42. In an electric switch, cooperating casing members presenting reduced ends having conductor openings therein and substantially flat oppositely located sides and between said sides a rounded protruding side which in turn presents an elongated slot extending longitudinally of the switch casing, and switch mechanism carried in said casing and having means for making and breaking a multiplicity of circuits and a swinging actuating member having its free end projecting through the slot in said rounded protruding side and movable along the latter into a multiplicity of operative positions in said slot in an arc substantially conforming to the curvature of said side.

43. Snap switch mechanism comprising stationary contact means, stationary actuating means presenting a plurality of projections, a resiliently mounted cooperating actuating projection riding over said projections and successively operative thereby with a snap action, movable contact means adjustable by the latter action while independent of the riding movements of said co-operating projection, and a swinging manually operable member, said cooperating projection, movable contact means, and swinging member being movable about the same axis.

44. Snap switch mechanism comprising stationary contact means, stationary actuating means presenting a plurality of projections, a resiliently mounted cooperating actuating projection riding over said projections and successively operative thereby with a snap action, movable contact means adjustable laterally by the latter action while independent of the vertical movements of said co-operating projection, and a swinging manually operable member, said cooperating projection, movable contact means, and swinging member being movable about the same axis in the same direction.

45. Snap switch mechanism comprising stationary contact means, stationary actuating means presenting an arcuately disposed series of adjacent projections, a resiliently mounted cooperating projection riding over said projections and successively operative thereby with a snap action, movable contact means adjustable by the latter action while moving in substantially a single plane, and a swinging actuating member, said cooperating projection, movable contact means, and actuating member being movable about the axis about which said adjacent projections are disposed.

46. Snap switch mechanism comprising stationary contact means, stationary actuating means presenting a plurality of upstanding projections, a resiliently mounted cooperating actuating projection riding over said projections, movable contact means adjustable laterally while independent of the riding movements of said co-operating projection, and a swinging manually operable member, said cooperating projection, movable contact means, and swinging member being movable about the same axis and having operative connections for changing the circuit connections with a snap action as said cooperating projection moves down one side of each stationary projection.

47. Snap switch mechanism comprising stationary contact means, stationary actuating means presenting series of adjacent upstanding projections, a resiliently mounted cooperating actuating projection riding over the same, movable contact means, and a reversely swinging manually operable member, said cooperating projection, movable contact means, and swinging member being movable about the same axis and having operative connections for changing the circuit connections with a snap action as said co-operating projection moves down either side of each stationary projection.

48. A switch mechanism comprising longitudinally divided casing members presenting conductor openings at opposite ends thereof and a longitudinal slot, and snap switch mechanism inside said casing having terminal connections connectable to conductors extending through said conductor openings and an actuating member movable longitudinally in said slot and having a multiplicity of different operative positions spaced along the latter.

49. A switch mechanism comprising longitudinally divided casing members presenting conductor openings at opposite ends thereof and a longitudinal opening in one of said members parallel to the meeting faces of said members, and switch mechanism inside said casing having terminal connections connectable to conductors extending through said conductor openings and an actuating member movable in either direction longitudinally in said longitudinal opening.

50. A switch mechanism comprising longitudinally divided casing members presenting conductor openings at opposite ends thereof and a longitudinal slot, and switch mechanism inside said casing having terminal connections connectable to conductors extending through said conductor openings and an actuating member movable in either direction into a plurality of different operative positions spaced longitudinally in said slot and having a pivot laterally displaced in said casing relative to said slot.

51. A switch mechanism comprising longitudinally divided casing members presenting conductor openings at opposite ends thereof and a longitudinal slot, switch mechanism inside said casing having terminal connections connectable to conductors extending through said conductor openings, an actuating member movable reversely longitudinally in said slot and having a pivot laterally displaced in said casing relative to said slot, and co-operating contact means and actuating means therefor actuated by said actuating member and disposed on opposite sides of the pivot of said actuating member.

52. A switch mechanism comprising longitudinally divided casing members presenting conductor openings at opposite ends thereof and a longitudinal slot, switch mechanism inside said casing having terminal connections connectable to conductors extending through said conductor openings and an actuating member movable longitudinally in said slot and having its pivot laterally displaced in said casing relative to said slot, and a through connection likewise connectable to conductors extending through said openings and disposed within said casing longitudinally thereof, said through connection being disposed between said pivot and said slot.

53. In a switch mechanism, a longitudinally divided casing presenting conductor openings at its ends, a longitudinally extending slot, a switch chamber between said openings, an insulated connecting means between each opening and said chamber, and unit locating co-operating projections, and a switch unit in said chamber comprising an insulating base positioned longitudinally by said connecting means and laterally by said projections, stationary and movable contacts carried by said base, terminals therefor carried by said base and connectable with conductors extending through said openings, and actuating mechanism likewise carried by said base and having an actuating member extending through said slot and movable about a pivot between said insulated connecting means.

In testimony whereof I affix my signature.

JOHANN G. PETERSON.